(12) United States Patent
Valiquette et al.

(10) Patent No.: US 7,036,273 B2
(45) Date of Patent: May 2, 2006

(54) BIO DYNAMIC INTERFACE SYSTEM FOR PLANT GROWING

(76) Inventors: Marc-André Valiquette, 4995 Chemin de la Côte-Ste-Catherine, App. #19 Montréal, Québec (CA) H3W 1M5; Yolande Dalpé, 10 rue Bell, Gatineau, Québec (CA) J9H 6E6; Valentin Furlan, 857, Boul, Wilfrid-Lavigne, Gatineau, Québec (CA) J9J 1Z2

( * ) Notice: Subject to any disclaimer, the term of this patent is extended or adjusted under 35 U.S.C. 154(b) by 2 days.

(21) Appl. No.: 10/715,805

(22) Filed: Nov. 18, 2003

(65) Prior Publication Data

US 2005/0102900 A1    May 19, 2005

(51) Int. Cl.
*A10G 27/02*    (2006.01)
*A01G 31/02*    (2006.01)
(52) U.S. Cl. ............................................. 47/80; 47/64
(58) Field of Classification Search ................ 47/59 R, 47/64, 59 S, 63, 32.7, 32.8, 65.5, 78, 80, 47/79, 60, 62 R, 904
See application file for complete search history.

(56) References Cited

U.S. PATENT DOCUMENTS

| | | | | |
|---|---|---|---|---|
| 4,294,037 A | * | 10/1981 | Mosse et al. ................ | 47/59 R |
| 4,735,016 A | * | 4/1988 | Hougard ......................... | 47/80 |
| 5,117,581 A | * | 6/1992 | Green et al. ..................... | 47/18 |
| 6,070,360 A | * | 6/2000 | Liao et al. ...................... | 47/80 |
| 6,219,969 B1 | * | 4/2001 | Dion .............................. | 47/79 |
| 6,247,268 B1 | * | 6/2001 | Auer ........................... | 47/62 R |
| 6,298,600 B1 | * | 10/2001 | Feldman ......................... | 47/67 |
| 6,672,007 B1 | * | 1/2004 | Lai ................................ | 47/79 |

FOREIGN PATENT DOCUMENTS

| DE | 29804118 U1 | * | 6/1998 |
|---|---|---|---|
| JP | 09009789 A | * | 1/1997 |

* cited by examiner

*Primary Examiner*—Son T. Nguyen
(74) *Attorney, Agent, or Firm*—Eric Fincham (57) ABSTRACT

A gardening system wherein there is provided an outer container and a soil support insert placed therein, the soil support insert is spaced with the bottom wall of the container to find a water space and an air space therebetween, the insert having at least one downwardly extending wall which defines a cavity and the downwardly extending wall having a plurality of apertures therein to permit root growth therethrough, a non-soil growing medium within the cavity, the non-soil growing medium including mycorrhizal fungi incorporated therein. The system provides for an enhanced plant growth.

10 Claims, 11 Drawing Sheets

Mycorrhizal spore germination

Fig. 6

Root tissue infection

Fig. 7

Root tissue colonization

Fig. 8

Mycorrhizal sporulation

Fig. 9

RESULTS OBTAINED WITH CULTIVATION OF LEEKS

BIO DYNAMIC INTERFACE SYSTEM FOR PLANT GROWING

FIELD OF THE INVENTION

The present invention relates to horticulture and more particularly, relates to a gardening system and a plant growing system.

BACKGROUND OF THE INVENTION

Container planting is well known and widely practiced by many professional and amateur gardeners. Its uses vary from locations wherein other types of gardening are impossible such as in urban settings including high rise buildings, for decorative and esthetic purposes, and flower boxes.

Container gardening is also widely practiced for optimum space utilization and design such as patio and solarium.

Moreover, there is increased interest in container gardening for commercial purposes.

To date, most container gardening consists of placing a desired amount of soil in a container and then placing the plant therein. There have been numerous proposals in the art for specific types of container structures which disclose various arrangements to permit automatic drainage and/or feeding and/or watering and the like. It is also known in the art to provide for a gardening system which utilizes separate zones, which include inserts for containing the growing medium and soil, with the roots being provided access to air, water and enough space for their optimal development. This system also prevents the spiral root growth pattern that is commonly associated with conventional plant containers. This system, described in U.S. Pat. No. 6,247,269 issued Jun. 19, 2001, has common inventorship with the present application.

SUMMARY OF THE INVENTION

It is an object of the present invention to provide an improvement to the system for plant growing described in U.S. Pat. No. 6,247,269.

It is a further object of the present invention to provide a plant growing system wherein plant growth is enhanced by the use of a fungus in a non-soil growing medium.

It is a further object of the present invention to provide a plant growing system wherein root damage is minimized.

It is therefore an object of the present invention to provide an improved container and gardening system which improves plant growth and plant productivity.

According to one aspect of the present invention, there is provided a gardening system comprising a container having a bottom wall and a side wall extending upwardly therefrom, a soil support insert spaced from the bottom wall to define a space between the bottom wall and the soil support insert, at least one wall extending downwardly from the soil support member to define a cavity, a plurality of apertures in the downwardly extending wall, water in the container, an air-space between an upper surface of the water and the soil support member, a non-soil growing medium within the cavity, said non-soil growing medium including mycorrhizal fungi, and a soil on top of the non-soil growing medium.

According to a further aspect of the present invention, there is provided a gardening method comprising the steps of supplying a gardening system comprising a container having a bottom wall and a side wall extending upwardly therefrom, a soil support insert spaced from the bottom wall to define a space between the bottom wall and the soil support insert, at least one wall extending downwardly from the soil support member to define a cavity, a plurality of apertures in the downwardly extending wall, water in the container, an air-space between an upper surface of the water and the soil support member, putting a non-soil growing medium within the cavity, placing a vesicular-arbuscular mycorrhizal inoculum on top of the non-soil growing medium and subsequently putting a soil on top of the mycorrhizal inoculum.

Mycorrhizal fungi are known universal symbionts living in close association with the majority of terrestrial plants. Thus, certain types of mycorrhizal fungi such as ectomycorrhizal fungi (several mushrooms) are associated with the roots of conifer trees. Ericoid mycorrhizal fungi colonize such plants as blueberry, cranberry and rhododendrons. Herbaceous plants as well as numerous deciduous and fruit trees, which make up more than 80% of the flora and include most of the cultivated crops, are living in symbiosis with vesicular-arbuscular mycorrhizal fungi (VAM fungi).

The VAM fungi are obligate symbionts as they cannot survive without living in close association with plants. However, in vitro culture technology is not convenient for large scale production of AM fungal inoculum. During the past decades, it has been demonstrated that VAM fungi can improve plant yield by a better supply of mineral nutrients, increase the production of flowers, protect the roots against phytopathogens, reduce transplantation shock due to a better water supply, increase resistance to drought, promote early vegetable growth, induce a better firmness of plant tissues, which contributes to extend the period of cold storage, increase the survival rate to winter and contribute to stabilize soil particles.

As previously mentioned, it is known from U.S. Pat. No. 6,247,269 to provide a gardening system which utilizes separate zones which include inserts for containing the growing medium and soil with the roots being allowed unlimited access to air and water. The teachings of this patent are hereby incorporated by reference.

In the particular aforementioned U.S. patent, there is taught the use of an insert within an outer container and which insert is designed to support the soil in a spaced relationship from the bottom of the container. The bottom of the container is provided with water while an air space is maintained between a portion of the growing medium and the liquid.

The inserts provide one or more cavities and which cavities extend downwardly into the area with the water. The cavities are filled, at the lower portion thereof, with a non-soil growing medium such as vermiculite while on top of the non-soil medium there may be provided a conventional dirt soil.

The system provides communication means between the exterior of the container and the interior, preferably one for liquid and one for gas. By so doing, air may freely flow in the space between the soil and the water.

In the improved system of the present invention, the ribs defining the slots in the lower portion of the container have an arcuate configuration, the arcuate portion facing towards the interior of the insert. It has been found that by providing such an arrangement, a significant amount of root damage is avoided.

Preferably, the ribs are spaced apart by a distance of between 1.5 and 3 millimeters, to provide slots which intently allow for root growth therethrough. The ribs defining the slots are also formed of a material which is compliant in nature. Thus, the ribs can be slightly deformed by the growing of the roots therethrough while not exerting any excess pressure on the roots. In other words, the rib will at least semi-permanently deform to permit root growth therethrough.

In a particular aspect of the present invention, it has surprisingly been found that the growth of the plants is significantly enhanced by use of mycorrhizal fungi within the non-soil growing medium.

The mycorrhizal fungi is utilized with the inert growing medium which is preferably vermiculite. It can also be mixed with the soil, or placed on top of the non-soil growing medium. Using the system of the present invention, one can enhance the mechanisms of soil ecology as well as achieve root growth improvement. With their extensive filament network, mycorrhizal fungi increase the area of root absorption in the soil much more than that of feeder roots and hairs. This results in increased absorption of relative mild soil nutrients and better plant nutrition, growth and development.

Mycorrhizal fungi prefer soil environment having a good soil aeration, a constant water supply, a stable temperature and low or medium phosphorous content. In the system of the present invention, the air-soil surface is large for the volume of soil and this allows a transfer of air from the soil to the atmosphere. Also, since aeration can occur from the bottom, air can easily move through the soil. Hence, the soil will allow aeration of the roots and of the aerobic mycorrhizal fungi. The system also provides enough carbon dioxide to allow VAM fungi to colonize the root system of most plants.

Mycorrhizal hyphae and spores have much thicker walls than most of the other fungi. Nonetheless, they require adequate amounts of water to prevent their dessication and subsequent death. Using the vermiculite interface provides an ideal environment to foster mycorrhizal growth and development.

The design of the system can also include a jacket around the soil containing inserts to protect the mycorrhizal fungi from the effect of such sudden heating and dessication.

It has also been found that the use of the system of the present invention substantially increases the production of mycorrhizal fungi in the soil medium. Indeed, the system can be used to reproduce the mycorrhizal fungi; after use in the present system, the vermiculite may be stored in a dry place which will trigger mycorrhizal sporulation. These spores and these root sections colonized with the VAM fungi will later give rise to new mycorrhizal growth when environmental conditions are suitable. Thus, the vermiculite may either be reused (with new vermiculite being added) or the vermiculite can be utilized as a mycorrhizal field inoculum for other soil applications. This is also true for the soil or compost substrate in the above layer of the root-forming interface.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1A:
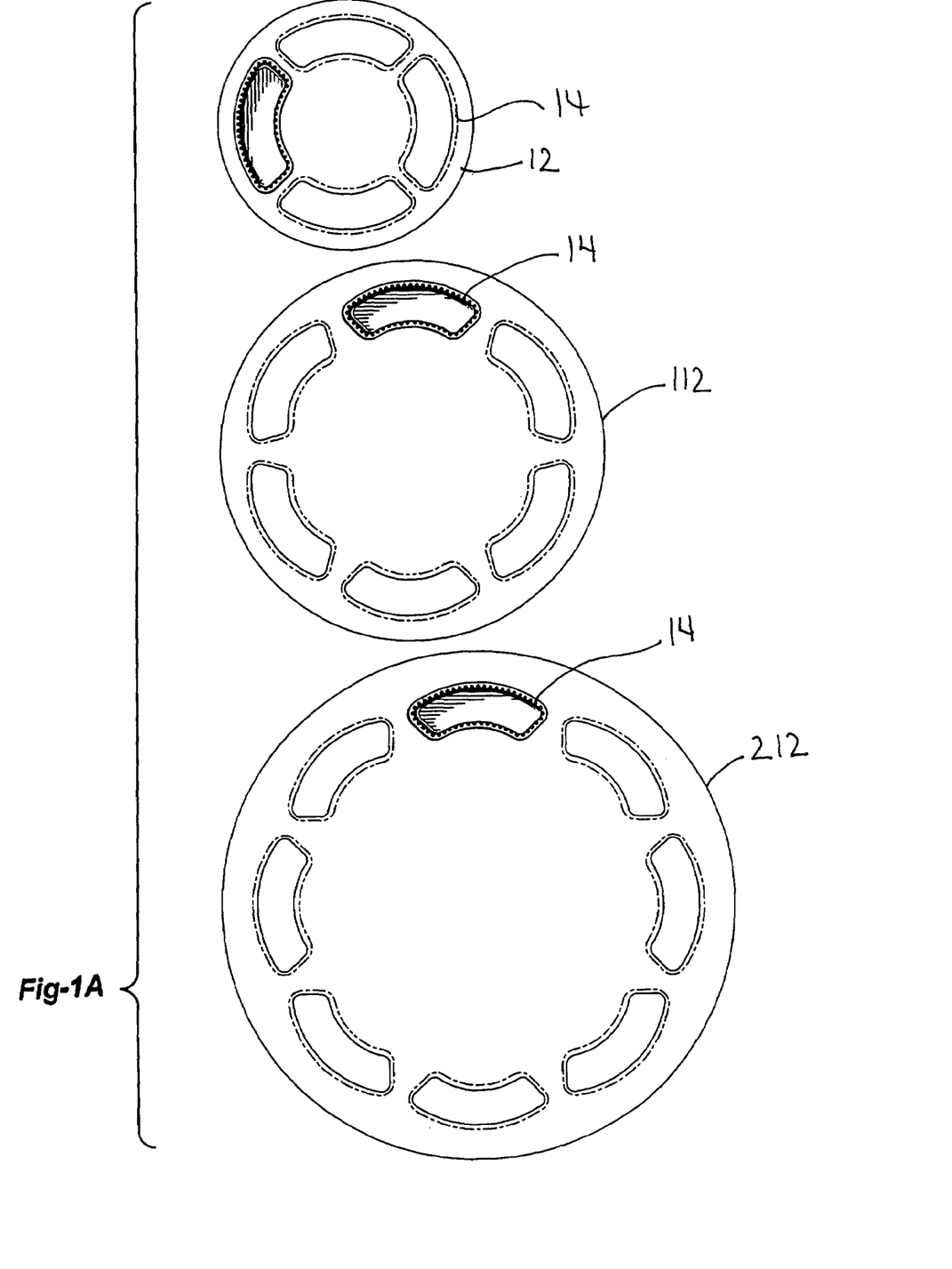
FIG. 1A is a top plan view showing different arrangements of a gardening system according to one embodiment of the present invention.
Figure 1B:
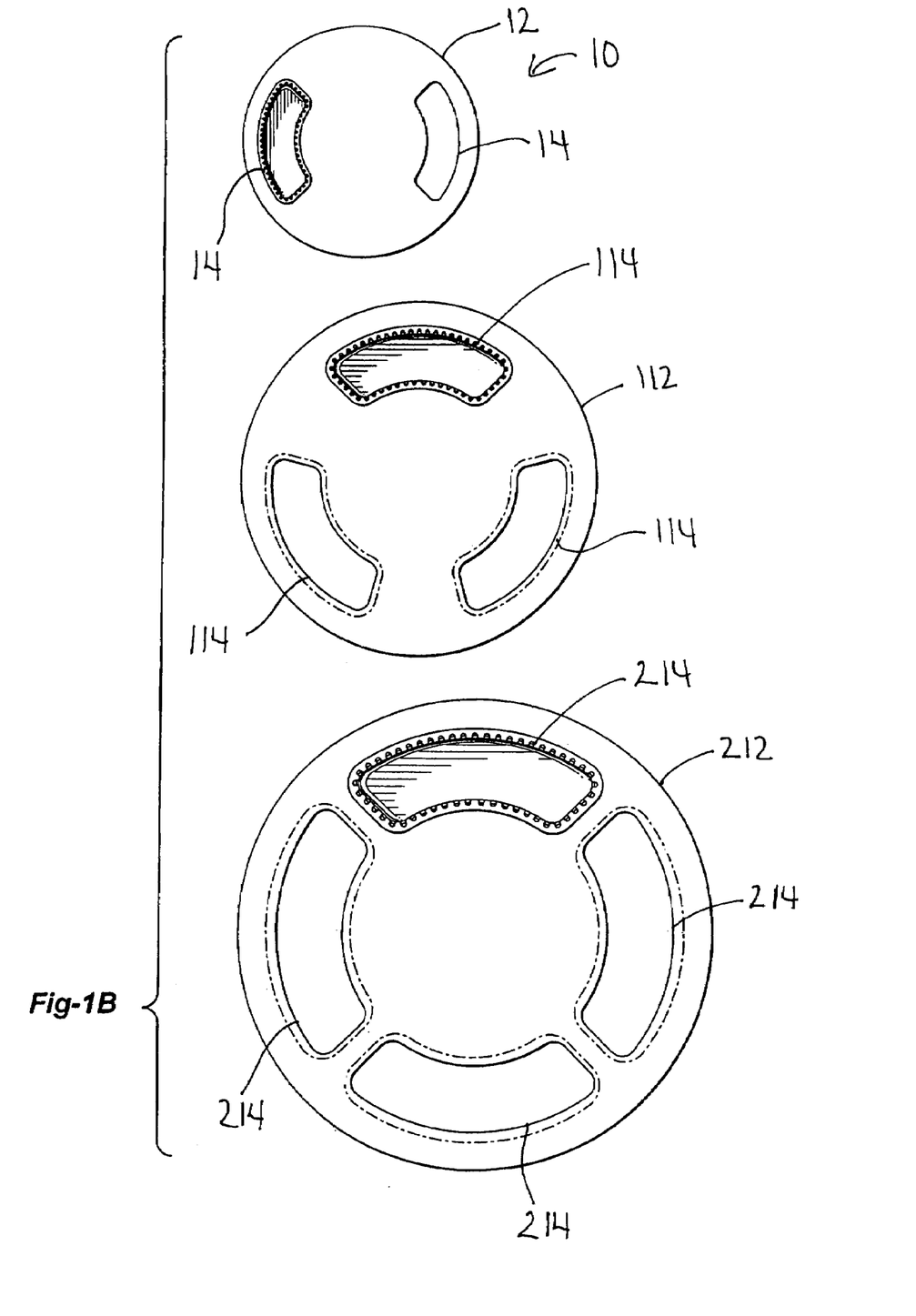
FIG. 1B is a top plan view showing another embodiment of the present invention.

Referring to the drawings in greater detail, and by reference characters thereto, there is illustrated in FIG. 1B three different arrangements for a plant growth system according to one embodiment of the present invention.

In the plant growth system which is generally designated by reference numeral 10, there is provided an outer container 12 which, in the first arrangement, is designed to receive a pair of inserts 14. Each of inserts 14 are somewhat hemispherical in an overall configuration such that two of the inserts will substantially fill container 12.

In the second arrangement, there is provided a larger outer container 112 which has a plurality of inserts 14, there being three such members. Finally, in the third embodiment, there is provided an outer container 212 having four inserts 14 located therein. In another embodiment of the present invention (FIG. 2) there is provided an outer container 112 which has a plurality of inserts 114 that are somewhat larger than inserts 14, there being three such members. Finally, in the third embodiment, there is provided an outer container 212 having four inserts 214 located therein. The containers may have an aperture 15.

An alternative arrangement is shown in FIG. 1A wherein the inserts 14 remain the same size while the container may increase in size but hold more of the inserts.

Figure 2:
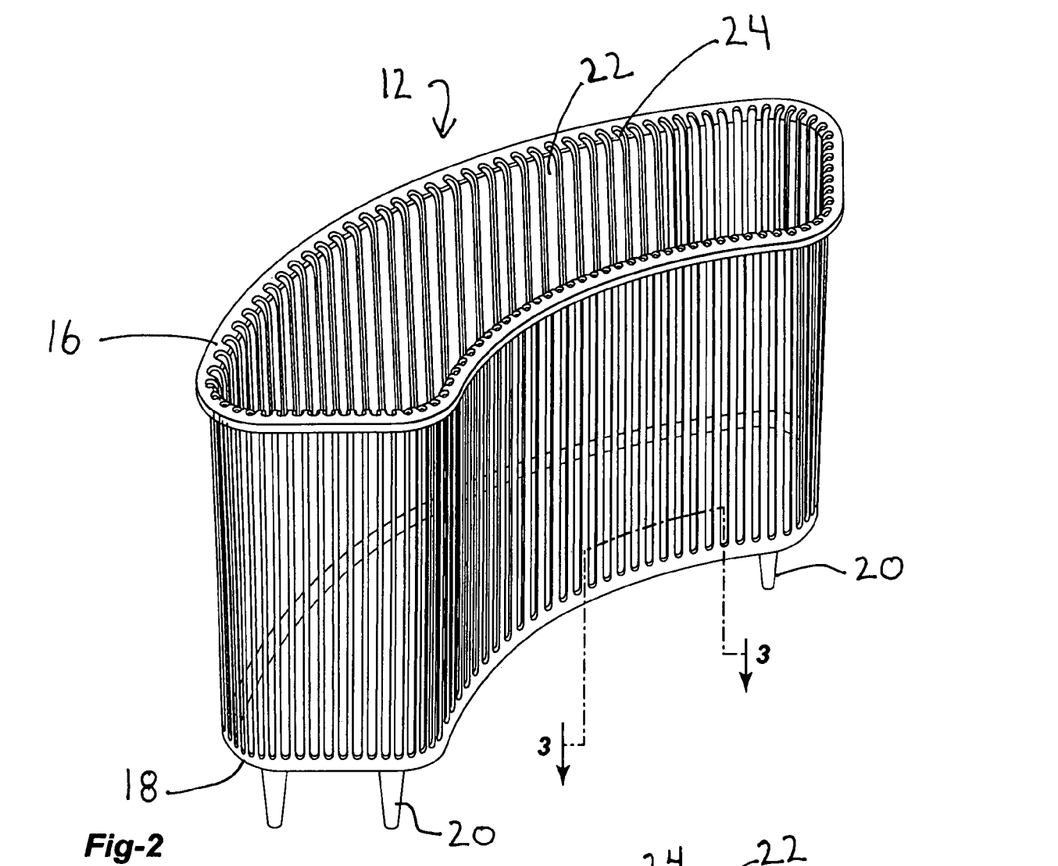
FIG. 2 is a perspective view of an insert according to one embodiment of the present invention.

As shown in FIG. 2, an insert 12 will have an upper rim 16 and a base 18. The member is designed to sit on legs 20 to keep it spaced from the bottom of a container 12 for reasons which have been previously discussed. The walls (and bottom) are comprised of a plurality of spaced-apart ribs 22 to thereby define elongated slots 24 therebetween. Preferably, each of the slots 24 have a width of between 1.5 to 3 mm.

Figure 3:
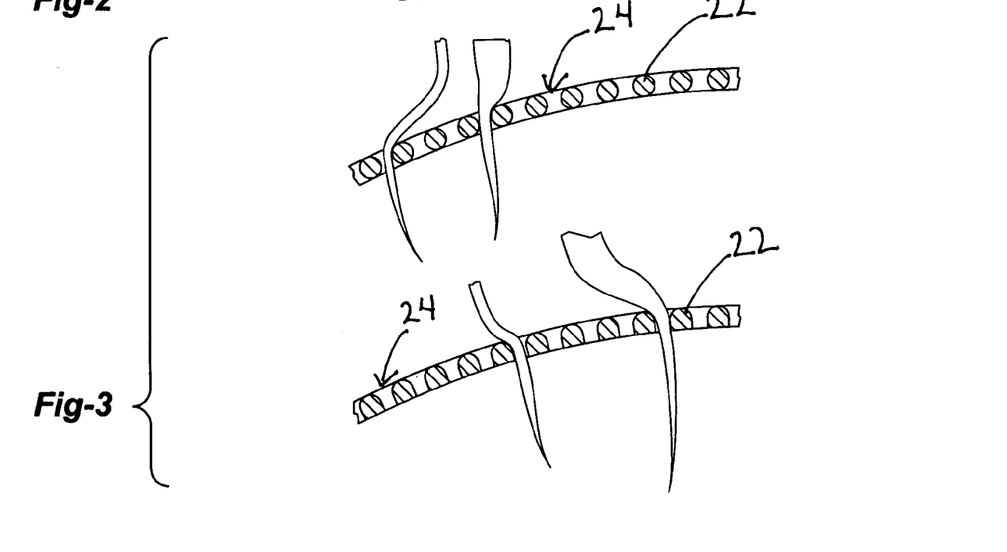
FIG. 3 illustrates varying arrangements for the ribs in cross-sectional view as taken along the lines 3—3 of FIG. 2.

As shown in FIG. 3, ribs 22 may have a circular configuration as shown in the upper portion of FIG. 3 thereof or alternatively, they may have only a rounded interior portion as shown in the lower portion of FIG. 3. In either case, the ribs present a smooth arcuate surface to the roots as they pass therethrough. Also, as previously mentioned, the ribs 22 are preferably formed of a material which is compliant in nature—i.e. it can be slightly deformed to easily permit the passage of roots therethrough without damaging the roots.

Alternatively, the ribs can present a smooth polygonal surface to the roots as they pass therethrough.

Turning to the arrangements shown in FIGS. 4 to 7, there is illustrated a plant growth system 30 which is similar to that shown in U.S. Pat. No. 6,247,269. Accordingly, only a portion of the container system is illustrated herein.

Figure 4:
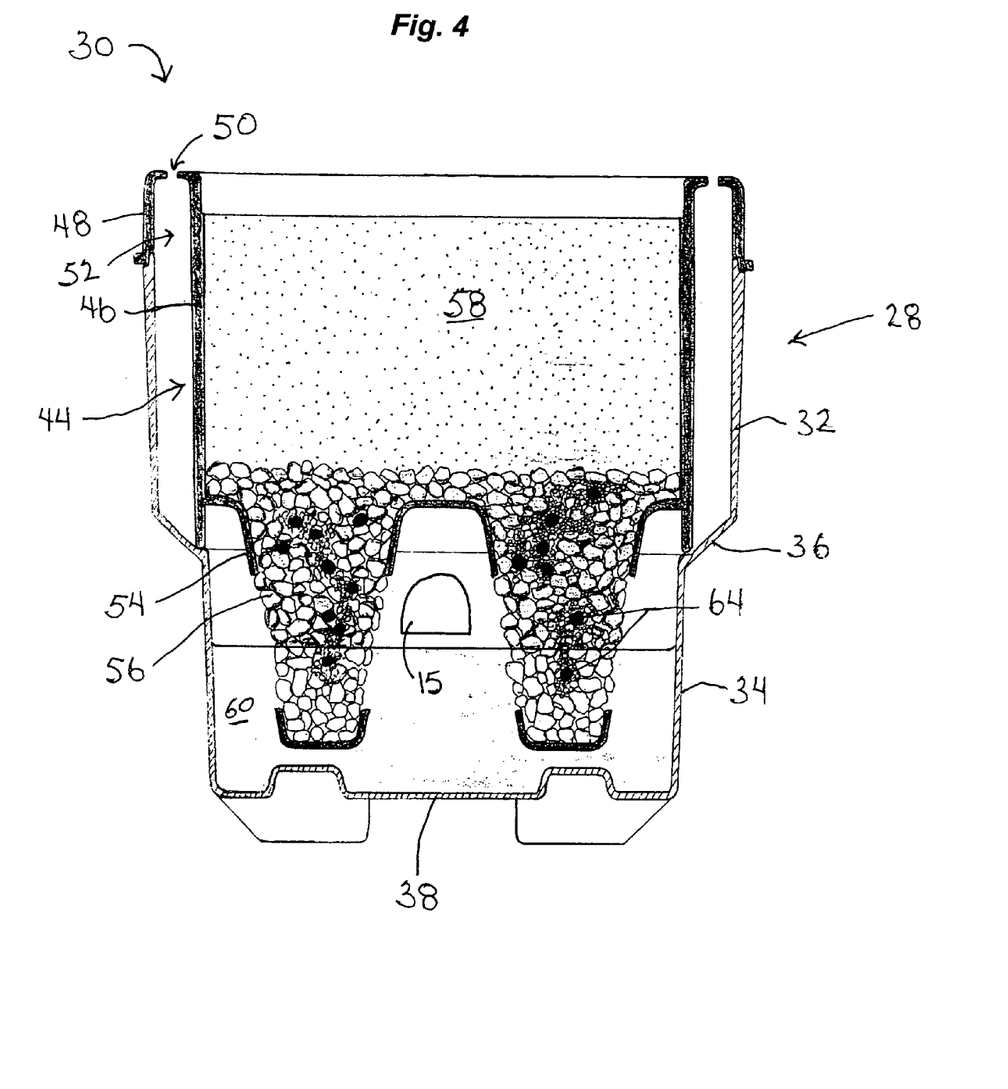
FIGS. 4 to 8 are cross-sectional views illustrating the various stages of plant growth and mycorrhizal fungi colonization utilizing the system of the present invention.
Figure 5:
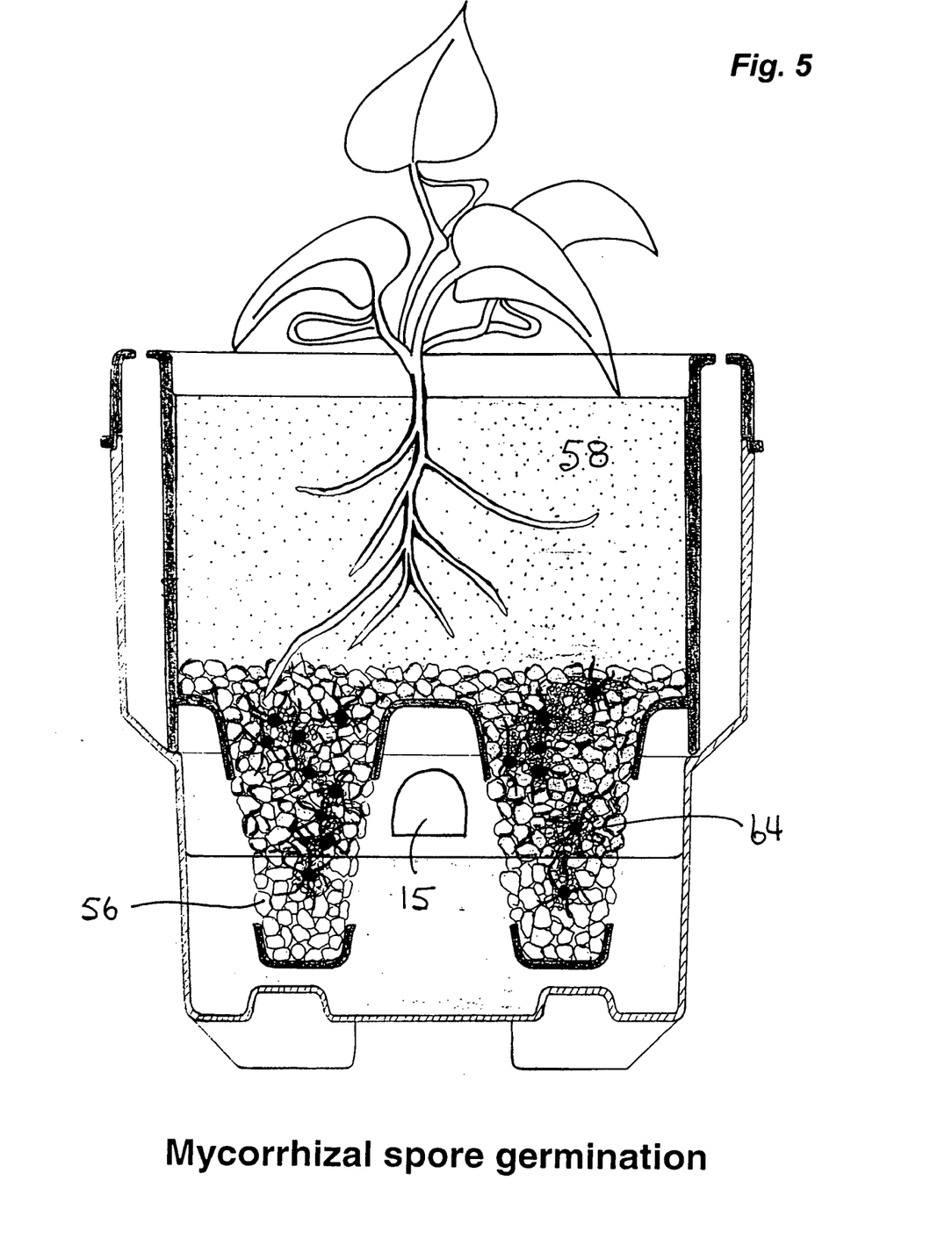
Figure 6:
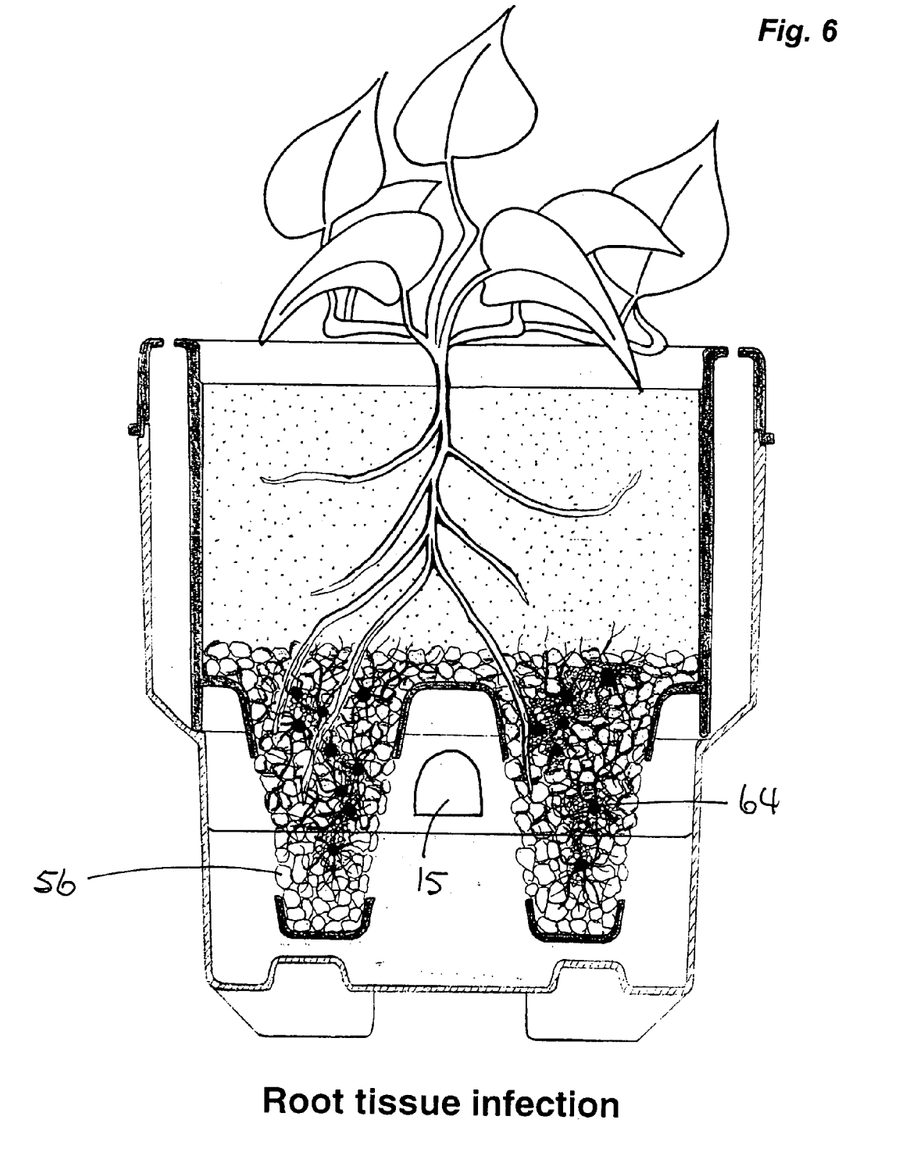
Figure 7:
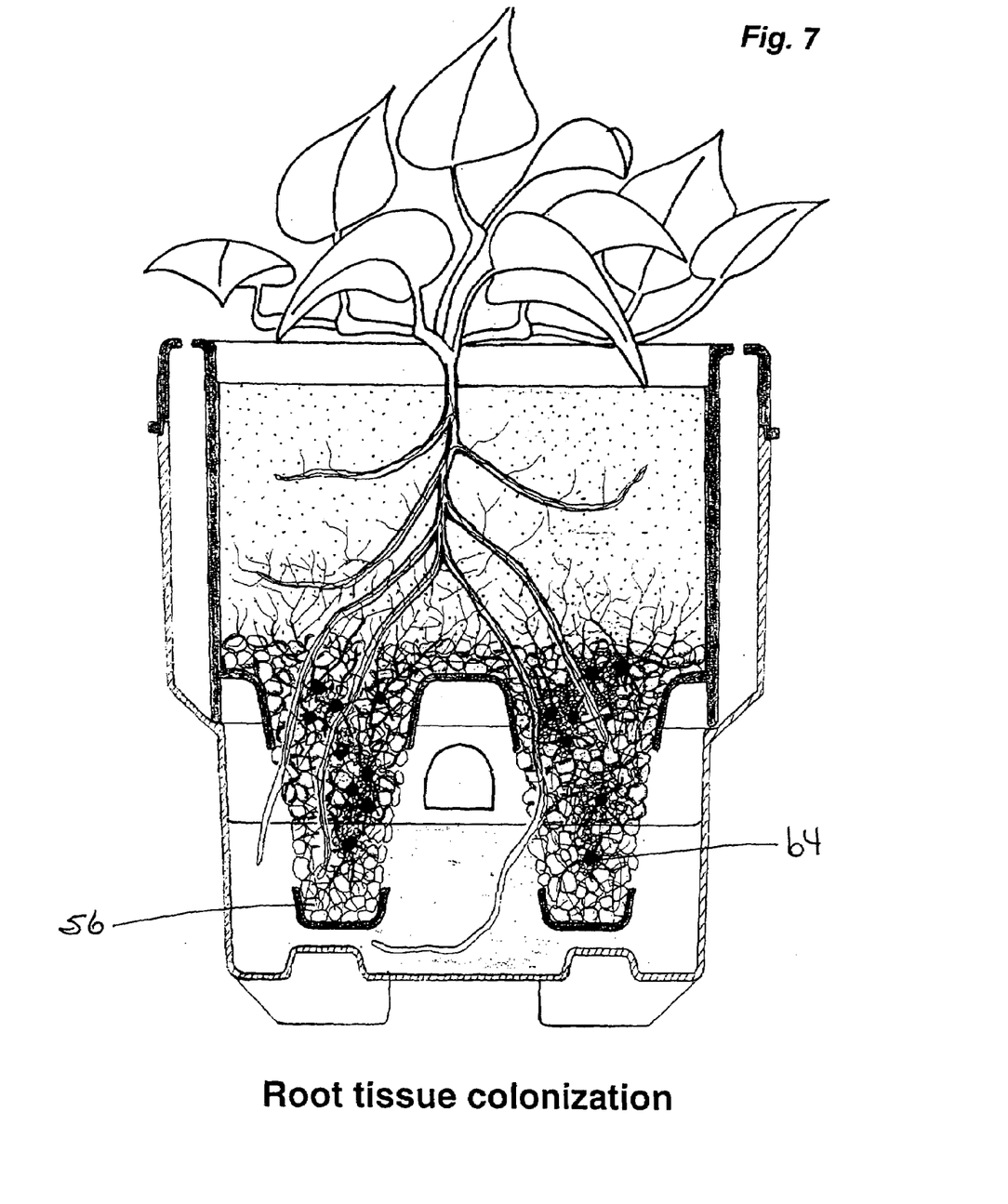
Figure 8:
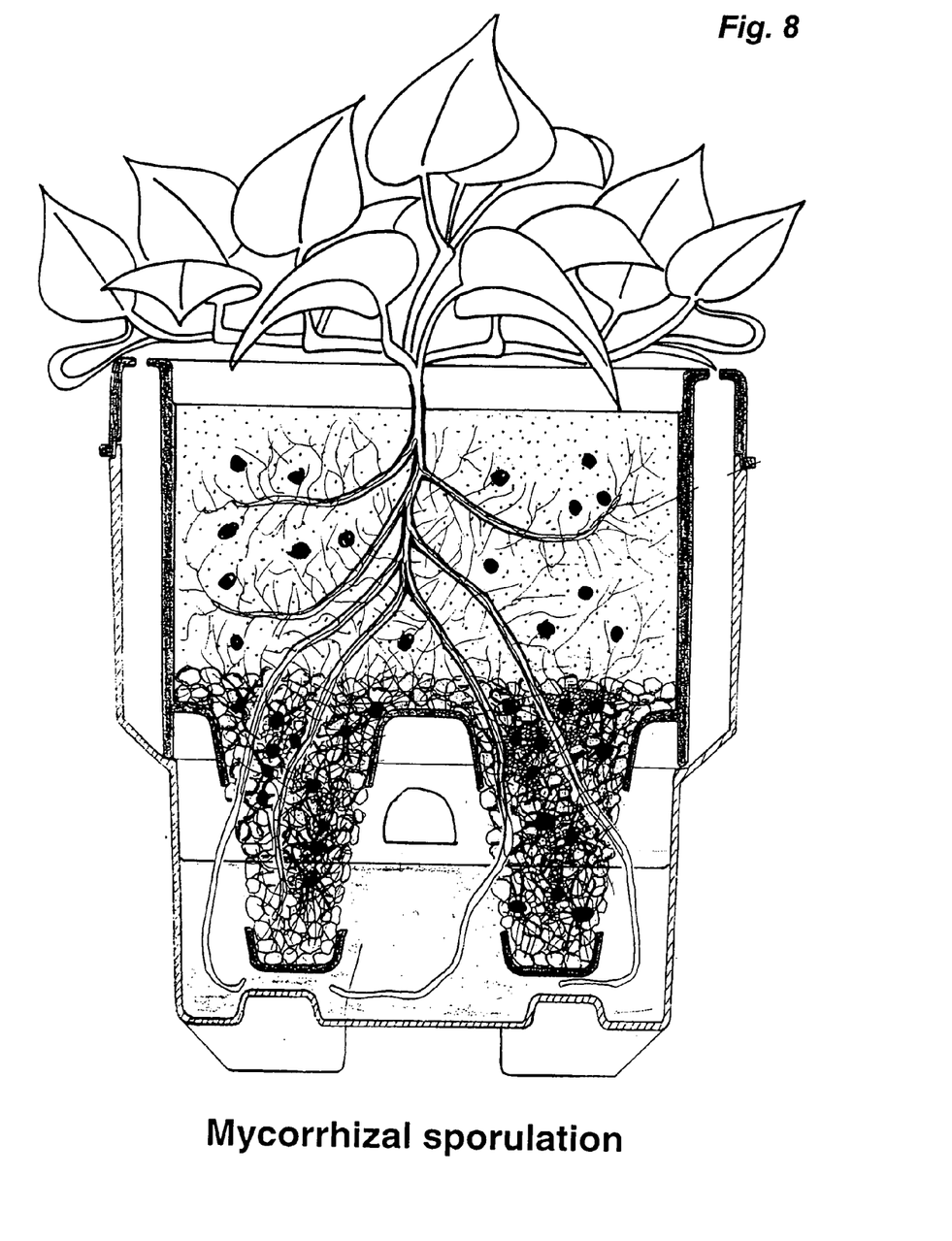

As shown in FIG. 4, there is provided a plant growth system 30 which includes an outer container generally designated by reference numeral 28. Outer container 28 has an upper side wall 32 and a lower side wall 34 which are joined together by merging section 36. There is also provided a bottom wall 38.

There is also provided an inner insert 44 of the type illustrated in U.S. Pat. No. 6,247,269.

Inner insert 44 has an upper inner side wall 46 and an upper outer side wall 48 which defines an air space 52 therebetween. Apertures 50 are provided in the merging section between upper inner side wall 46 and upper outer side wall 48. As may be seen, inner insert 44 seats on both the upper marginal edge of upper side wall 32 and on merging section 36 of outer container 28.

As described in the aforementioned U.S. patent, there are provided inner cavities defined by inner cavity walls 54 which are formed in a manner similar to that described in the patent and in the embodiment of FIG. 1 herein—i.e. a plurality of ribs defining vertically extending slots as well as some horizontal slots.

As shown in FIG. 4, the inner insert 44 has a lower portion thereof filled with an inert growing medium such as vermiculite 56 while on top thereof there is supplied a conventional soil 58. In the bottom of container 28, there is provided water 60 which is at a level so as to allow for air-space 62.

The vermiculite 56 is inoculated with mycorrhizal fungi as designated by reference numeral 64. As shown in FIGS. 5 through 8, the mycorrhizal fungi spores 64 then infect the root tissue of the plants and aid in the plant being able to access greater nutrients from the soil element (like phosphorous, copper, zinc, etc.). These nutrients are basically insoluble but with the use of the fungi, they become more easily bioavailable. Also, the development of the root system permits the plant to gain access to a larger volume of soil and thereby gain greater access to the nutrition elements.

It has also been shown that the inoculum can also be placed at the interface of the non-soil growing medium and the soil, or close to it, for better results.

Figure 11:
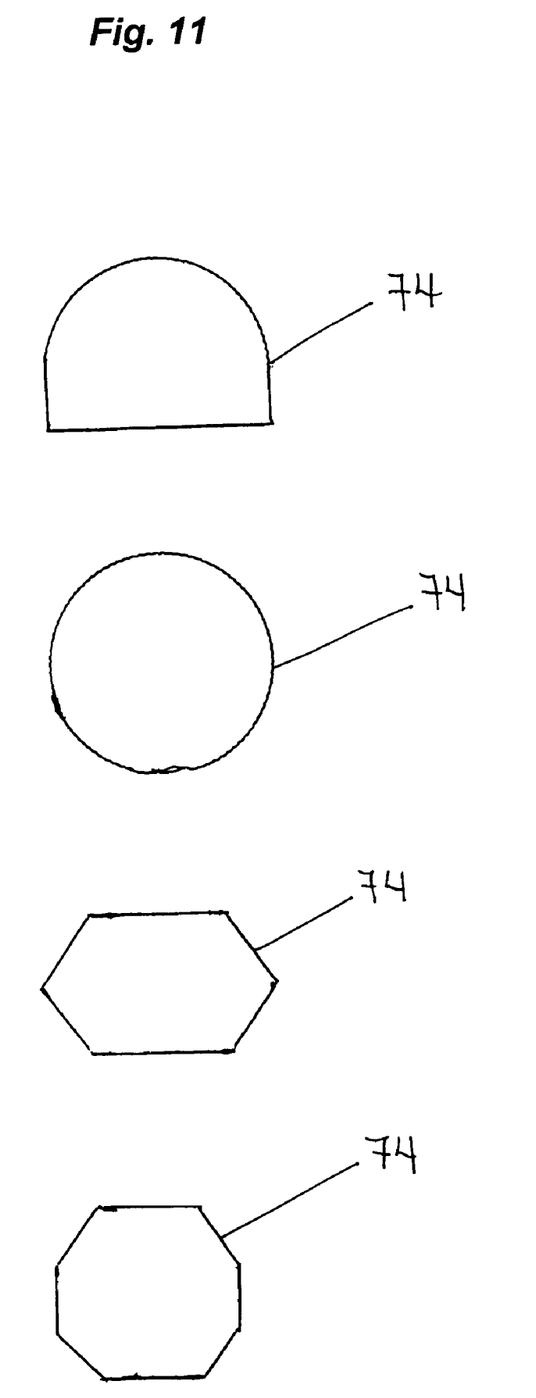
FIG. 11 is a schematic illustration of the cross-sectional configuration of various types of ribs.

As illustrated in FIG. 11, the ribs may be of various cross-sectional configurations. A typical rib is generally designated by reference numeral 74 and as shown, may have a semi-spherical, or probably hexagonal configuration.

EXAMPLE 1

Seeds were sown both in a gardening system according to the present invention and in a conventional garden soil. In both instances, a control not using mycorrhizal fungi was run as well as one wherein the plants where inoculated with mycorrhizal fungi. In both instances, an organic soil having a compost base was utilized and a liquid plant fertilizer having 20% of marine algae extract was used according to the instructions of the manufacturer.

Figure 9:
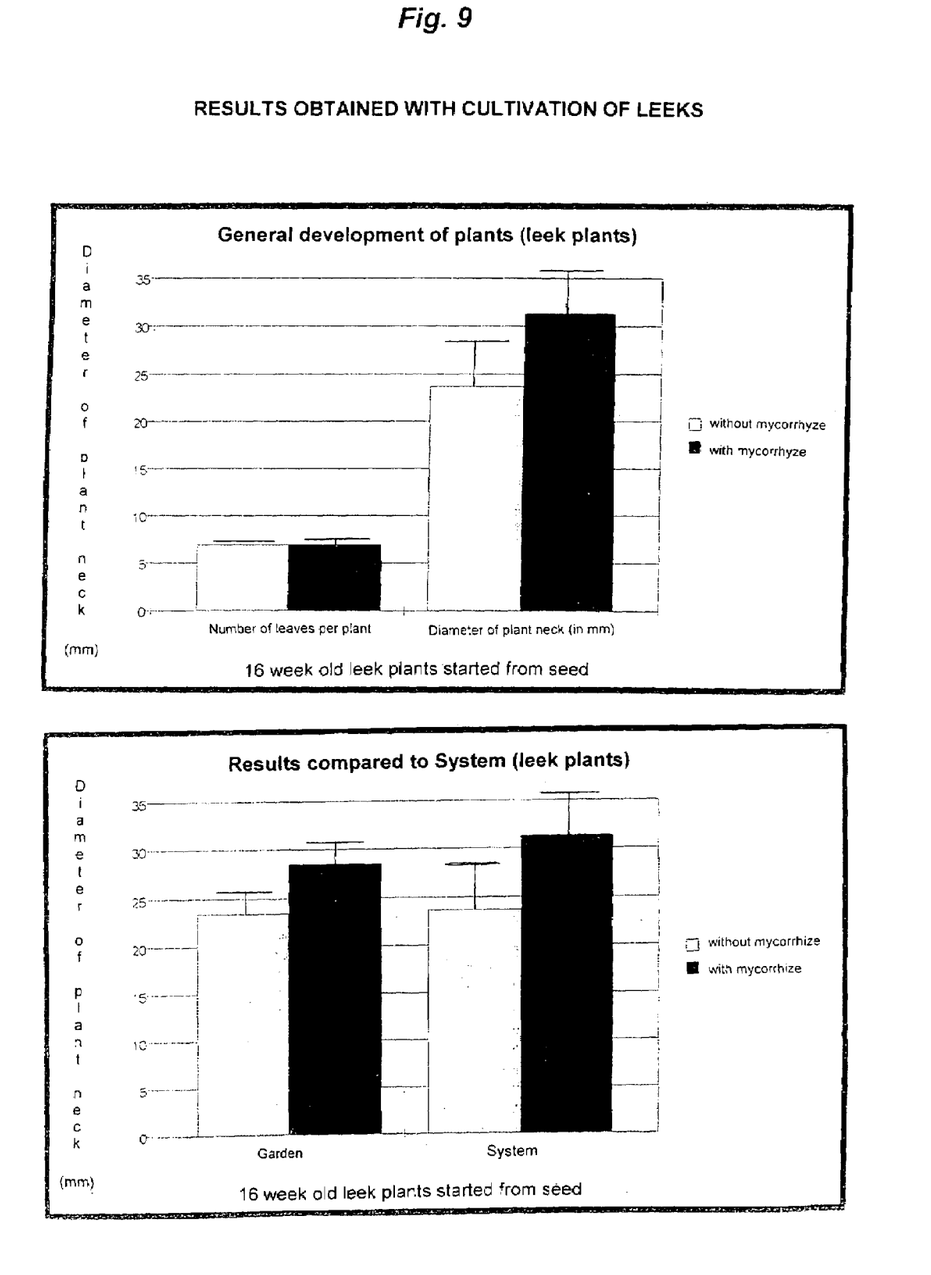
FIG. 9 is a series of graphs illustrating the growth of elite plants using the system of the present invention, both with and without fungi, and a comparison to leeks grown in a normal garden.
Figure 10:
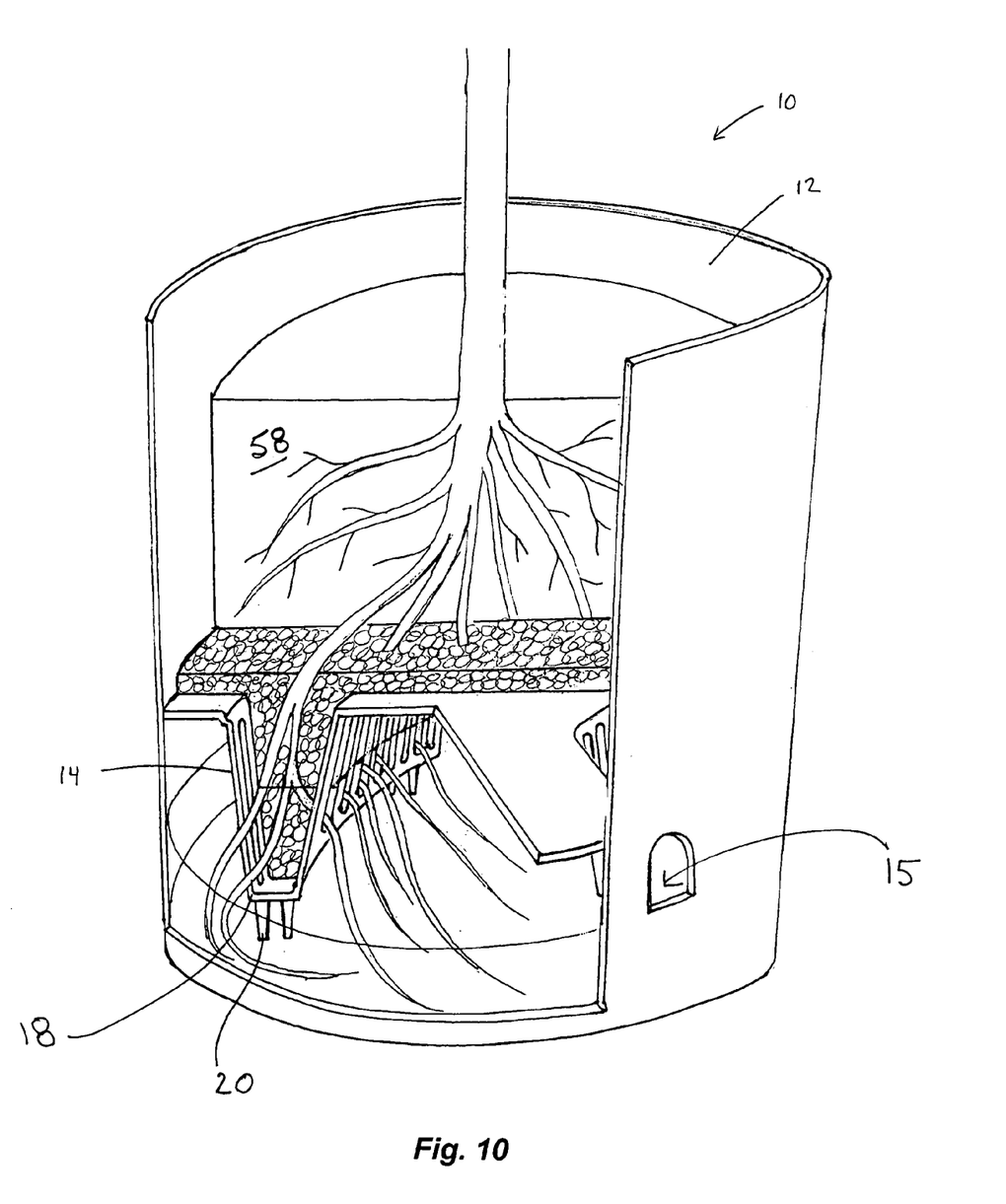
FIG. 10 is a side elevational view, partially cut-away, illustrating the growth of a plant in a system according the present invention.

FIG. 9 is a graph illustrating the results obtained. As will be noted, the non-mycorrhizal fungi controls were similar for both the garden and the system of the present invention. When utilizing the mycorrhizal fungi in the conventional garden soil, there was an improvement in the diameter of the plant as expected. Using the fungi in the container system according to the present invention, there was a substantially greater improvement of plant growth compared to the control and also compared with inoculated plants.

It will be understood that the above described embodiments are for purposes of illustration only and that changes and modifications may be made thereto without departing from the spirit and scope of the invention.

We claim:

1. A gardening system comprising a container having a bottom wall and a side wall extending upwardly therefrom, a soil support insert spaced from said bottom wall to define a space between said bottom wall and said soil support insert, at least one wall extending downwardly from said soil support insert to define a cavity, a plurality of elongated slots in said downwardly extending wall, said elongated slots being defined by a plurality of parallel ribs, each of said ribs having arcuate inner and outer surfaces to prevent root damage, said elongated slots having a width sufficient to permit root growth therethrough, water in said container, an air-space between an upper surface of said water and said soil support insert, a non-soil growing medium within said cavity, said non-soil growing medium including mycorrhizal fungi, and a soil on top of said non-soil growing medium.

2. The gardening system of claim 1 wherein said elongated slots have a width of between 1.5 and 3 mm.

3. The gardening system of claim 2 wherein each of said ribs is made of a compliant material to allow root growth and root diameter increment therethrough.

4. The gardening system of claim 1 wherein said non-soil growing medium comprises vermiculite or any root growth promoting material that is environment friendly, hydrophilic, non toxic, imputrescible, inert and light.

5. The gardening system of claim 4 wherein there are provided a plurality of walls extending downwardly to thereby define a plurality of cavities, each of said downwardly extending walls having a plurality of elongated slots formed therein.

6. The gardening system of claim 5 wherein said plurality of cavities comprises at least 2 cavities in a side by side relationship.

7. The gardening system of claim 1 wherein said container has a plurality of said soil support inserts placed therein.

8. The gardening system of claim 7 wherein said soil support inserts have an overall arcuate configuration.

9. A gardening system comprising a container having a bottom wall and a side wall extending upwardly therefrom, a soil support insert spaced from said bottom wall to define a space between said bottom wall and said soil support insert, at least one wall extending downwardly from said soil support insert to define a cavity, a plurality of elongated slots in said downwardly extending wall, said elongated slots being defined by a plurality of parallel ribs, each of said ribs having arcuate inner and outer surfaces to prevent root damage, said elongated slots having a width sufficient to permit root growth therethrough, water in said container, an air-space between an upper surface of said water and said soil support insert, a non-soil growing medium within said cavity, a vesicular-arbuscular mycorrhizal inoculum placed on top of said non-soil growing medium and a soil on top of said mycorrhizal inoculum.

10. A gardening method comprising the steps of supplying a gardening system comprising a container having a bottom wall and a side wall extending upwardly therefrom, a soil support insert spaced from said bottom wall to define a space between said bottom wall and said soil support insert, at least one wall extending downwardly from said soil support insert to define a cavity, a plurality of elongated slots in said downwardly extending wall, said elongated slots being defined by a plurality of parallel ribs, each of said ribs having arcuate inner and outer surfaces to prevent root damage, said elongated slots having a width sufficient to permit root growth therethrough, water in said container, an air-space between an upper surface of said water and said soil support insert, putting a non-soil growing medium within said cavity, placing a vesicular-arbuscular mycorrhizal inoculum on top of said non-soil growing medium and subsequently putting a soil on top of said mycorrhizal inoculum.

* * * * *